Aug. 6, 1968  W. STELZER  3,395,537
PROPORTIONING VALVE
Filed Nov. 18, 1966  2 Sheets-Sheet 1

INVENTOR.
William Stelzer
BY
Harness, Dickey & Pierce
ATTORNEYS

Aug. 6, 1968 W. STELZER 3,395,537
PROPORTIONING VALVE
Filed Nov. 18, 1966 2 Sheets-Sheet 2

INVENTOR.
William Stelzer
BY
Harness, Dickey & Pierce.
ATTORNEYS.

United States Patent Office 3,395,537
Patented Aug. 6, 1968

3,395,537
PROPORTIONING VALVE
William Stelzer, Bloomfield Hills, Mich., assignor to Kelsey-Hayes Company, a corporation of Delaware
Filed Nov. 18, 1966, Ser. No. 595,486
9 Claims. (Cl. 60—54.5)

ABSTRACT OF THE DISCLOSURE

A brake pressure proportioning valve is adapted to modulate the fluid pressure at one or more brake cylinders with respect to the fluid pressure generated by a fluid motor.

---

The device of the present invention is an improvement of the device disclosed in copending application Ser. No. 532,471 filed March 7, 1966, for: Brake Pressure, Proportioning Valve and assigned to the assignee of the present invention.

It is an object of the present invention to provide a brake pressure proportioning valve of the general type disclosed in said application Ser. No. 532,471 wherein a two-stage reduction in fluid pressure occurs at one or more brake cylinders with respect to increasing fluid pressure generated by a fluid motor.

Other objects and advantages of the present invention will become apparent from the following detailed description taken in conjunction with the accompanying drawings, wherein.

Figure 1:
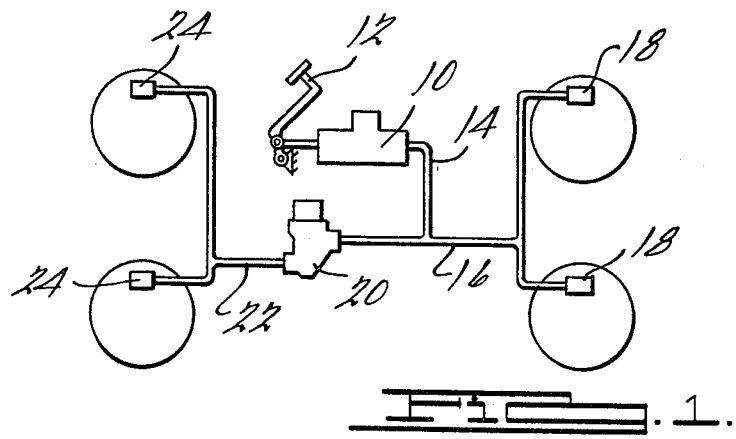
FIGURE 1 is a schematic view of a brake system having the device of the present invention incorporated therein.
Figure 2:
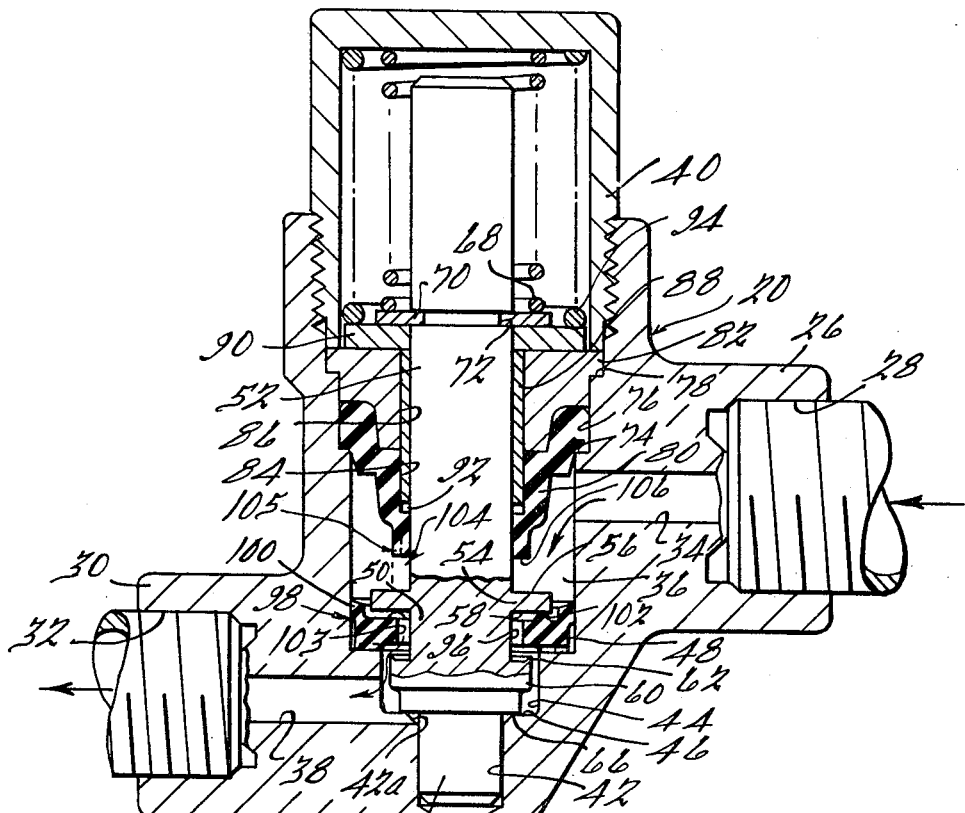
FIG. 2 is an enlarged vertical sectional view of the device of the present invention as shown in FIG. 1.

Referring now to FIGURES 1 and 2, a fluid motor of a hydraulic braking system in the form of a standard master cylinder 10 is operated by a brake pedal 12 to deliver brake fluid under pressure through a conduit 14. The conduit 14 is connected on one end to a conduit 16, leading to a pair of front brake cylinders 18 and also leading to a housing 20. The housing 20 forms a part of the device of the present invention and encloses the remaining parts thereof. Fluid under pressure is normally transmitted directly through the housing 20 to a conduit 22 leading to a pair of rear brake cylinders 24. It will thus be apparent that the delivery of brake fluid to the front brake cylinders 18 is accomplished directly from the master cylinder 10, while the device of the present invention is interposed in the path between the master cylinder 10 and the rear brake cylinders 24 either to transmit master cylinder pressure directly to the rear brake cylinders 24 or to modify the pressure delivered to the rear brake cylinders 24 relative to front brake cylinder pressure.

The housing 20 has an inlet boss 26 provided with a threaded inlet opening 28 arranged to receive brake fluid from the conduit 16, and an outlet boss 30 having a threaded outlet opening 32 adapted to communicate brake fluid to the conduit 22. A passage 34 is formed in the housing leading from the inlet opening 28 to a central bore shaped chamber 36. The passage 34 communicates with the chamber 36 generally at its mid-length, while a passage 38 will be seen to extend from the lower end of the chamber 36 to the outlet opening 32. The chamber 36 is conveniently formed by drilling and/or boring the housing 20 from its upper end. The uper end of the chamber 36 is closed by a cap or closure number 40. The housing 20 has a blind bore 42 at its lower end facing toward the chamber 36 and disposed coaxially therewith. The bore 42 has an angular recess 42a at the upper edge thereof. The chamber 36 has a reduced diameter portion 44 at its lower end adjacent to the bore 42, which is of still lesser diameter than the portion 44. It will be seen that an annular shoulder 46 is formed on the housing 20 between the chamber portion 44 and the bore 42, and that an annular shoulder 48 is formed on the housing 20 between the main portion of the chamber 36 and the reduced diameter portion 44 thereof.

The blind bore 42 serves to slidably support and guide a pressure responsive valve element or piston 50 having an elongated cylindrical portion 52 and a radially extending annular flange 54 provided with a radially extending annular shoulder 56 on one side thereof and a radially extending annular shoulder 58 on its other side. Disposed below the flange 54 on the valve element 50 is an annular valve head or shoulder 60 having a raised annular rim 62 on the upper edge thereof. Disposed at the lowermost end of the valve element 50 is a projection 64 which is slidably fitted in the blind bore 42.

The pressure responsive valve element 50 is biased downwardly so that a shoulder 66, disposed adjacent the lower end thereof just above the projection 64, abuts the shoulder 46 of the housing 20. This is accomplished by means of a spring 68 which is seated against the cap 40 at its upper end and engages a snap ring 70 at its lower end. The snap ring 70 is of the usual split type which may be expanded so as to be fitted into an annular groove 72 machined in the elongated cylindrical portion 52 of the valve element 50.

The housing 20 is counterbored above the chamber 36 to provide a shoulder 74, a recess 76, and another shoulder 78, all of annular configuration. The shoulder 74 supports a lip seal 80 of elastomeric material, which sealably engages the cylindrical portion 52. A filler plug 82 is seated on the shoulder 78 and is held in place by the cap 40, thereby engaging the seal 80 and providing reinforcement thereto against pressures in the chamber 36. A recessed portion 84 in the seal 80 and a central aperture 86 in the plug 82 are suitably spaced from the cylindrical portion 52 to permit the slidable disposition of a sleeve 88 therebetween. One end of the sleeve 88 abuts a metal washer 90, thereby leaving an annular space 92 between the bottom of the seal portion 84 and the other end of the sleeve 88. The metal washer 90 is engaged on the outer portion of its upper side by a spring 94 which is spacedly disposed around the spring 68 to abut the inside top of the cap 40 and which exerts a downward force to hold the washer 88 against the plug 82 and sleeve 88.

The valve element 50 has a reduced diameter cylindrical portion 96 interposed between the shoulder 58 and the valve head 60 thereof. Spacedly surrounding the portion 96 is an elastomeric annular valve member 98. The valve member 98 is engageable with the shoulder 48, the wall of the chamber 36, and the annular shoulder 58, the valve head 60 functions either to permit the transmission of fluid pressure from the chamber 36 to the outlet opening 32, or to close this fluid path and modulate the pressure at the outlet opening 32 with respect to the pressure at the inlet opening 28. This is accomplished by the vertical movement of the pressure responsive element 50 in response to the various fluid pressures acting thereon.

It will be seen that the valve member 98 has an upwardly extending lip 100 which, in the free state of the valve member 50, is inclined angularly upwardly and radially outwardly. When the valve member 98 is fitted in the chamber 36, its lip 100 is deflected radially inwardly slightly by the engagement of its outer periphery with the wall of the chamber 36. This prevents the downward flow of fluid from the chamber 36 around the lip 100. The flange 54 of the valve element 50 lies partly within the lip 100, and its shoulder 58 engages a plurality of spaced semispherical bosses 102 projecting upwardly from the upper side of the valve member 98. The outer diameter of the flange 54 is less than the inner diameter of the lip 100, thus permitting fluid to flow from the chamber 36 through the spaces between the bosses 102. Also, the diameter of the cylindrical portion 96 of the valve element 50 is less than the diameter of an inner peripheral surface 103 of the valve member 98 adjacent thereto so that an open fluid path exists from the space between the bosses 102 to the passage 38 when the element 50 is disposed in the position illustrated in the drawing. This path remains open until the fluid pressure delivered to the passage 34 from the master cylinder 10 reaches a predetermined level, for example, 300 p.s.i. This pressure will be sufficient on the bottom of the valve 50 to move the valve element 50 upwardly against the force of the spring 68 until the rim 62 engages the valve member 98 and closes the fluid path therethrough. Subsequent increases in master cylinder pressure will act on the valve element over an effective annular area equal to the difference between the diameter of the cylindrical portion 96 and the mean sealing diameter of the rim 62. This area is indicated at 104 in the drawings. This will cause the valve element 50 to move downwardly to re-open the passage between the valve element 50 and the valve member 98. The increased pressure delivered beneath the valve element 98 will act against the lower end of the valve element 50 to reclose the passage. In practice, the rim 102 remains closely adjacent the valve element 98, bleeding in all amounts of fluid thereby to increase the outlet pressure at a lesser rate than the inlet pressure is increased. This is because the area of the lower end of the valve element 50 against which outlet pressure acts is greater than the opposing annular area 104 of the valve element between the cylindrical portion 96 and the rim 102 against which inlet fluid pressure acts. The increase in outlet fluid pressure produced by a given increase in inlet fluid pressure will be inversely proportional to the ratio of said areas. This will produce a pressure in the passage 34 of say 500 p.s.i. and a pressure in the passage 38 which might be 400 p.s.i., depending on the pressure exerted by the spring 68. When a higher pressure, such as 600 p.s.i., moves the washer 90 and the spring 94, the effective annular area against which further increases in inlet pressure will act in an effort to re-open the valve 50, is reduced from the area 104 to an annular area 105. The annular area 105 equals the annular area 104 minus the cross-sectional annular area of the sleeve 88. The cross-sectional area of the sleeve 88 must now be deducted from the area 104 because inlet fluid now acts against the sleeve 88 (through the seal 80) to deliver a force to the valve element 50 negating a portion of the downward force delivered to the valve element.

Figure 4:
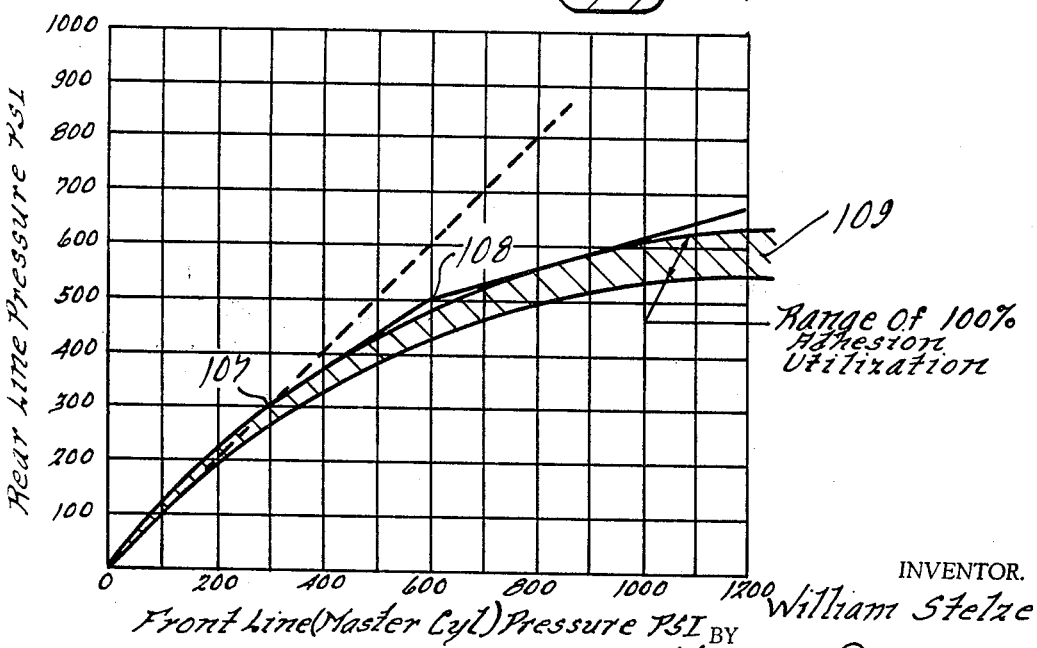
FIG. 4 is a graph showing the performance of the device illustrated in FIG. 2.

The difference between the annular area 105 and the opposing area of the lower end of the valve element 50 is much greater than the difference between the annular area 104 and the area of the lower end of the valve 50. Accordingly, the ratio of further increase in master cylinder pressure to the resulting increase in rear brake pressure will be even more pronounced. This further change in the proportion of brake pressures is desirable to more closely approximate the ideal proportions indicated in FIG. 4 by the number 109. It may be assumed that the greater the master cylinder pressure, the greater will be the deceleration of the vehicle. The greater the deceleration of the vehicle, the greater will be the weight transfer from the rear to the front wheels. The ratio of front brake pressure to rear brake pressure should, therefore, be increased as master cylinder pressure is increased in order to take advantage of the increased adhesion of the front wheels (due to the greater weight carried by such wheels) without producing premature rear wheel skid. The point 107 of FIG. 4 illustrates the initial closure of the valve element 50 against the valve member 98. The point 108 represents the point at which the spring 94 yields and the sleeve 88 becomes effectively a part of the valve element 50. It will be noted that from zero to 300 p.s.i. the same pressure will obtain for the inlet and outlet passages 34 and 38. From 300 to 600 p.s.i. a given increase in master cylinder pressure will produce an increase in rear brake pressure having a first ratio to the increase in master cylinder pressure. From 600 p.s.i up, an increase in master cylinder pressure will produce an increase in rear brake pressure having a second lesser ratio to master cylinder pressure.

Figure 3:
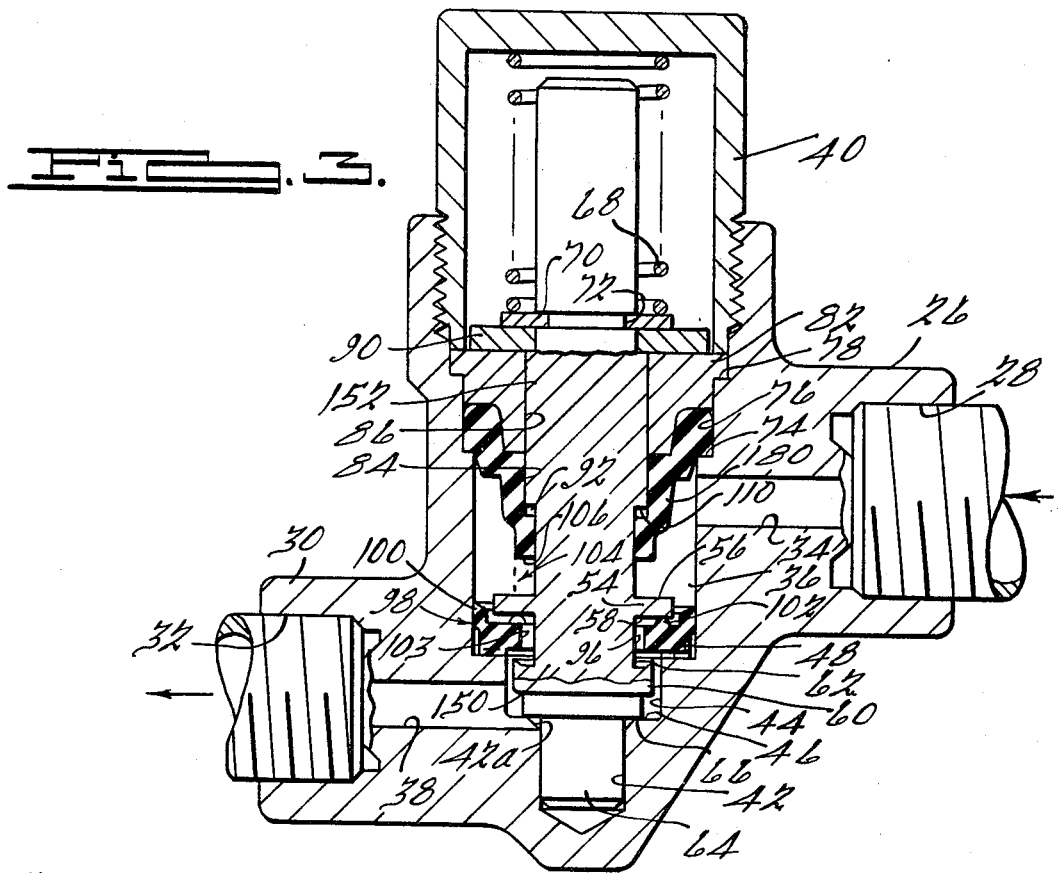
FIG. 3 is a sectional view of a modification of the device illustrated in FIG. 2.

FIG. 3 illustrates a slightly modified form of the invention in which a valve element 150 is shaped in all respects like the valve element 50 except that the sleeve 88 is formed integrally with the valve element to define a cylindrical portion 152 thereof having an annular shoulder 110 normally spaced from but engageable by a seal 180 which seals between the valve element 150 and the wall of the chamber 36. The seal 180 is made from a harder, less pliable elastomer than the seal 80, and it will not deflect to engage the shoulder 110 until approximately the same point that the spring 94 yielded in the prior embodiment of the invention. The seal 180 has, in effect, its own built-in-spring, eliminating the necessity for a separate spring 94. Upon a reduction of pressure in the passage 34 by a reduction in applied pressure on the foot pedal, the valve element 50 or 150 will move upwardly to make more room for the fluid at the outlet 32. In so doing, the rim 102 imbeds in the elastomeric valve member 98. The rear brake pressure will go down on the same curve as it went up as a result of such upward movement until the net upward force of the brake fluid pressure acting on the valve element 50 (or 150) is less than the opposing spring force. At this point the valve will move downwardly, and the direct fluid communication path between the inlet and the outlet is re-opened.

While it wall be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A pressure proportioning device adapted to be interposed between the master cylinder and a brake cylinder of a vehicle hydraulic brake system, said device including a housing having an inlet, an outlet and a bore providing communication between said inlet and outlet, a plunger disposed in said bore and having a valve head and a cylindrical portion, a valve seat engageable by said valve head to block fluid communication through said bore, an elastomeric seal surrounding and engaging said plunger cylindrical portion and exposed to fluid pressure in said bore on one side thereof, a spring biasing said plunger to a position in which said valve head is open, said plunger being movable under the influence of a predetermined level of fluid pressure in said bore acting thereagainst over an effective area equal to the cross-sectional area of said cylindrical portion to cause said valve head to engage said valve seat and commence a pressure modulating function and shoulder means associated with said plunger on the opposite side of said seal from the fluid pressure in said bore, the pressure of fluid in said bore being operable to act through said seal against said shoulder to produce a supplementary force on said plunger additive to the force produced by the action of fluid pressure against said effective area, said supplementary force being delivered to said plunger only after the pressure in said bore reaches a level greater than the pressure at which said plunger moves against said spring and begins its pressure modulating function.

2. The structure set forth in claim 1, wherein said seal has the shape of a sleeve of stepped diameter.

3. The structure set forth in claim 1 in which said seal has an annular shoulder engageable with said plunger shoulder means.

4. The structure set forth in claim 1 in which said plunger shoulder means is of annular shape and is disposed radially outwardly of said cylindrical portion of said plunger.

5. The structure set forth in claim 1 in which said plunger shoulder means comprises an annular shoulder integrally formed on said plunger.

6. The structure set forth in claim 5 in which said seal possesses sufficient stiffness that it will not yield and transmit a force against said plunger shoulder means until a predetermined fluid pressure is reached in said bore which is higher than said predetermined level.

7. The structure set forth in claim 1 in which said plunger shoulder means comprises a separate sleeve surrounding said plunger cylindrical portion and within which said plunger cylindrical portion is axially slidable.

8. The structure set forth in claim 7 including a second spring normally holding said sleeve against movement with said plunger and means for transmitting the force produced by fluid pressure acting on said sleeve against the first mentioned of said springs after said second spring has yielded.

9. The structure set forth in claim 1 in which said seal is normally out of contact with said shoulder.

References Cited

UNITED STATES PATENTS

| | | | |
|---|---|---|---|
| 2,991,797 | 7/1961 | Baldwin | 60—54.5 |
| 3,315,469 | 4/1967 | Stelzer | 60—54.5 |

MARTIN P. SCHWADRON, *Primary Examiner.*

R. R. BUNEVICH, *Assistant Examiner.*